United States Patent
Huangfu (10) Patent No.: US 8,587,579 B2
(45) Date of Patent: Nov. 19, 2013

(54) ARRAY SUBSTRATE AND DRIVING METHOD THEREOF

(75) Inventor: Lujiang Huangfu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 507 days.

(21) Appl. No.: 12/881,401

(22) Filed: Sep. 14, 2010

(65) Prior Publication Data

US 2011/0096051 A1 Apr. 28, 2011

(30) Foreign Application Priority Data

Sep. 18, 2009 (CN) .......................... 2009 1 0093386

(51) Int. Cl.
G06F 3/038 (2013.01)
G09G 5/00 (2006.01)

(52) U.S. Cl.
USPC ........................................................ 345/211

(58) Field of Classification Search
USPC ........................................ 345/88, 93, 98–100
See application file for complete search history.

(56) References Cited

U.S. PATENT DOCUMENTS

| | | | |
|---|---|---|---|
| 4,870,396 A | 9/1989 | Shields | |
| 5,844,538 A | 12/1998 | Shiraki et al. | |
| 6,181,311 B1 * | 1/2001 | Hashimoto | 345/98 |
| 2004/0090411 A1 | 5/2004 | Lee et al. | |
| 2006/0139239 A1 * | 6/2006 | Maeda et al. | 345/50 |
| 2010/0144391 A1 * | 6/2010 | Chang et al. | 455/566 |

FOREIGN PATENT DOCUMENTS

| | | |
|---|---|---|
| CN | 1115066 A | 1/1996 |
| CN | 1723484 A | 1/2006 |
| CN | 1782836 A | 6/2006 |
| GB | 2 343 980 A | 5/2000 |
| JP | 2009-042405 A | 2/2009 |
| WO | 2007/055454 A1 | 5/2007 |

\* cited by examiner

Primary Examiner — Kent Chang
Assistant Examiner — Nathan Brittingham
(74) Attorney, Agent, or Firm — Ladas & Parry LLP (57) ABSTRACT

A driving method for an array substrate of a liquid crystal display, the method comprising: performing a display refresh operation on each pixel unit on the array substrate in a row sequence so as to refresh working storage elements in each pixel unit row by row, until the working storage elements of the pixel units in all rows in one image frame is refreshed, thus image voltage signals corresponding to the pixel units in each row are inputted to the working storage elements to be held; inputting a frame refresh "ON" signal to display refresh switches of the pixel units in each row, and inputting the image voltage signals held in the working storage elements of the pixel units in each row to the pixel electrodes of the pixel units in each row as image signal voltages, so that one image frame is refreshed; after charging for pixel capacitors of the pixel units in each row has completed in each row, inputting a frame refresh "OFF" signal so as to turn off the display refresh switch, so that the working storage elements of the pixel units in each row prepare to the storage for the image voltage signals for the next frame.

7 Claims, 6 Drawing Sheets

ARRAY SUBSTRATE AND DRIVING METHOD THEREOF

BACKGROUND

Embodiments of the invention relate to an array substrate and a driving method thereof.

Currently, thin film transistor liquid crystal displays (TFT-LCDs) are widely used flat panel displaying devices. A TFT-LCD comprises an array substrate and a color filter substrate, which are bonded together with liquid crystal interposed therebetween. Liquid crystal is driven to be rotated by an electrical field formed between the array substrate and the color filter substrate, thus the light transmissivity is changed and different grey levels or different images are presented.

Figure 1:
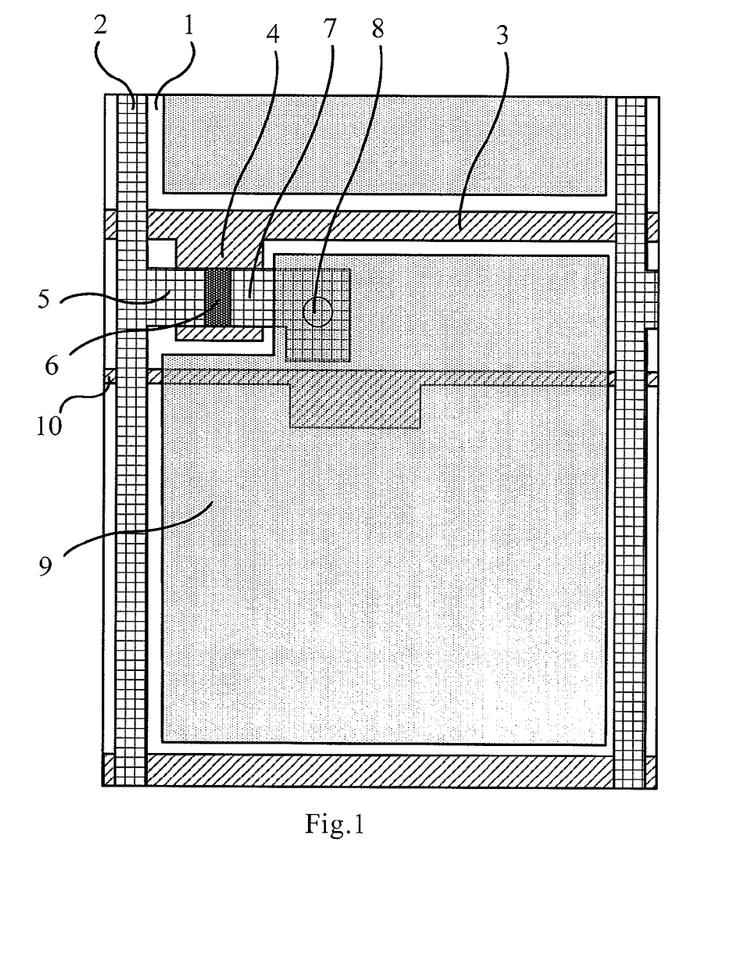
FIG. 1 is a schematic top view showing a structure of a pixel unit of an array substrate in the prior art.

A top view illustrating a part of a pixel unit in a conventional TFT-LCD array substrate is shown in FIG. 1. Gate lines 3 and data lines 2 are crossed with each other on a base substrate 1 so as to define a plurality of pixel units in a matrix. A pixel electrode 9 and a TFT drive switch are arranged in each pixel unit. Generally, common electrode lines 10 are further disposed on the array substrate. For clarity, insulating layers (such as a gate insulating layer and a passivation layer) formed between the conductive structures are not shown in the drawing. The TFT drive switch may comprise a first gate electrode 4, a first active layer 6, a first source electrode 5, and a first drain electrode 7. The first drain electrode 7 is connected with the pixel electrode 9 via a first via hole 8. When a turning-on ("ON") voltage of a higher potential is applied on the first gate electrode 4, the first source electrode 5 is electrically communicated with the first drain electrode 7; when a turning-off ("OFF") voltage of a lower potential is applied on the first gate electrode 4, the source electrode 5 is disconnected with the first drain electrode 7. During operation, the "ON" voltage is applied to the gate line 3 so as to turn on the TFT drive switch in each pixel unit, and then the data line 2 applies an image voltage signal to the pixel electrode 9 in each pixel unit through the TFT drive switch.

The color filter substrate also comprises a base substrate on which a black matrix is formed for blocking the light-proof regions such as the regions where the data lines, the gate lines and the TFT drive switches are located. A common electrode is formed on the black matrix, and a common electrode line supplies a common voltage to the common electrode. The common voltage applied on the common electrode and the image signal voltage applied to the pixel electrode in a pixel unit form an electrical field, which controls the deflection of the liquid crystal molecular and further controls the intensity of the transmitted light, i.e., the light transmissivity of the pixel unit.

A field sequential color (FSC) type TFT-LCD is one kind of TFT-LCDs. Typically, for the FSC type TFT-LCD, no color filter resins are provided on the color filter substrate; however, the color of the image is presented by illuminating of back lights of different colors in a time-sharing manner, that is to say, an image frame is divided into three image sub-frames (or three image fields). Each image sub-frame starts when the data line begins to input the data voltage signal and ends when the data line begins to input the data voltage signal for the next image sub-frame. In the three image sub-frames, three homochromous back lights of red, green and blue colors are illuminated sequentially. Since the alternation frequency of the image sub-frames is high, the human beings will not feel the time-sharing display of the three colors but see the colorful image frame after color mixing.

Figure 2:
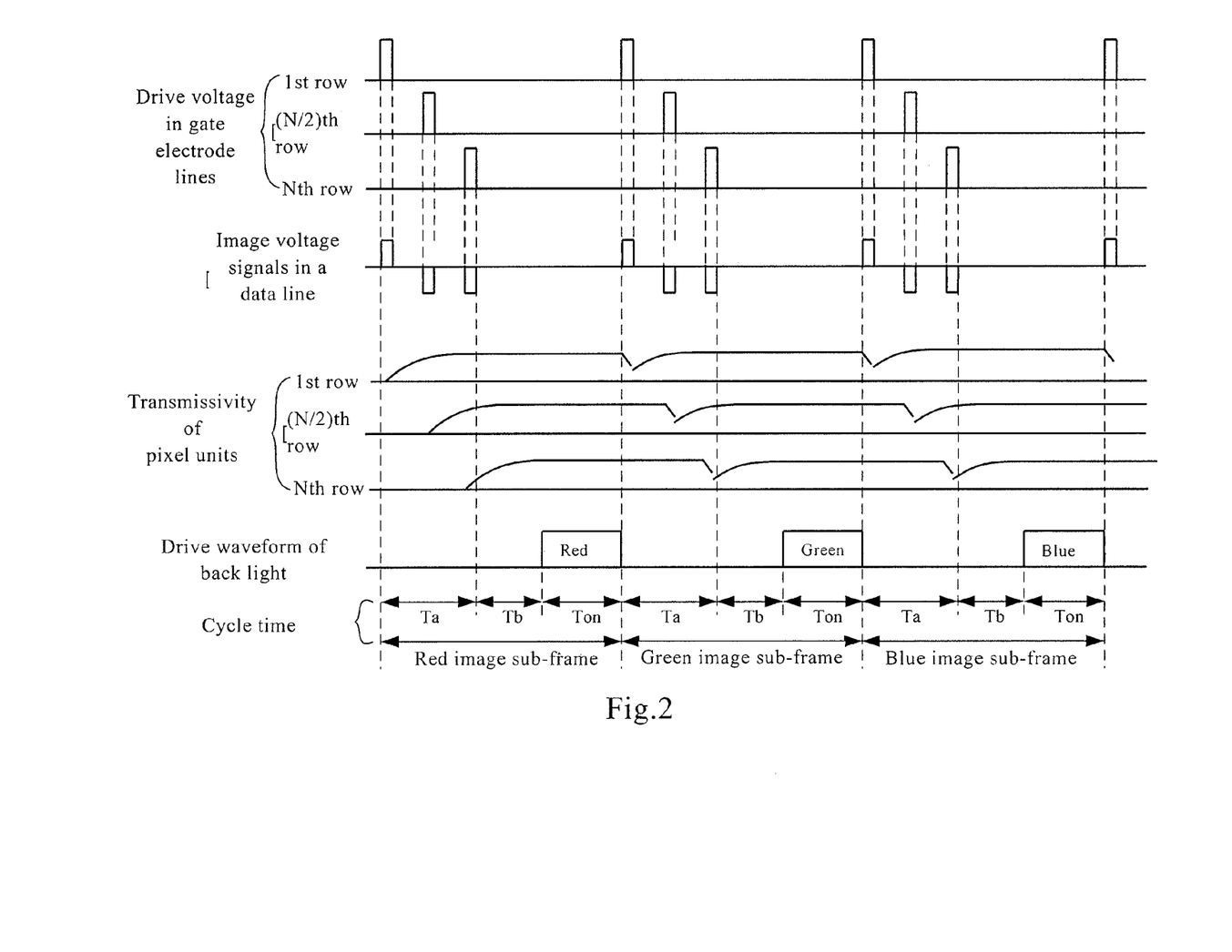
FIG. 2 is a schematic view showing a drive waveform over time of a conventional FSC type TFT-LCD.

FIG. 2 is a schematic view of a drive waveform over time of a conventional FSC type TFT-LCD. The axis of abscissa is a time axis. According to the up-to-down sequence, the three rows of waveforms in the first group are waveforms of the drive voltages in the gate lines, which are at an "ON" voltage in the case of a higher potential. FIG. 2 schematically shows the drive voltage waveforms in the first row, the (N/2)th row and the Nth row, where N is a natural number and the row number of the total pixel units in the array substrate. The drive voltage variation pattern of other unspecified rows is similar to those mentioned above. In the example, the description is made in the case "N" is an even number; however, the number of the gate lines may be an odd number. The row of waveform in the second group is the image voltage signals in one data line. FIG. 2 only shows the image voltage signals in the data line of a certain column when an "ON" voltage is inputted into the gate lines in the first row, the (N/2)th row and the Nth row. The image voltage signals for the pixel units in each row may be different. Three rows of waveforms in a third group are the light transmissivity variation waveforms for the pixel units in the first row, the (N/2)th row and the Nth row under the driving of the above drive voltages and image voltage signals. The row of waveform in the fourth group is a waveform for driving to light the back lights. Of two rows in the fifth group, the first row represents the cycle time of each image sub-frame, and the second row represents the cycle times for three image sub-frames of red, blue and green for each image frame. As shown in FIG. 2, each image sub-frame comprises three periods of time. Taking the red image sub-frame as an example, it comprises a row scanning period Ta, a response period Tb and a back light lighting ("ON") period Ton. The row scanning period Ta is the time period in which a line-by-line scanning is performed for all the gate lines on the array substrate so as to realize a pixel electrode display refresh, which starts when the gate line in the first row inputs an "ON" voltage and ends when the input of an "ON" voltage from the last row of gate lines is completed. One line scanning refers to that an "ON" voltage is inputted over one of gate lines so that the image voltage signals in the data lines can be inputted. The display refresh refers to that the pixel electrode voltage in one pixel unit is changed, which renders the display of the pixel unit changed. When the display across the whole array substrate is changed, an image refresh occurs. The response period Tb refers to the time period in which the liquid crystal completes its rotation under the influence of the electrical field and which starts when the row scanning period Ta ends and ends when the liquid crystal corresponding to the last row has responded (i.e., has completed the rotation). The back light "ON" period Ton is the time period in which the back light of the color corresponding to the image sub-frame is in a lighting state, which starts when the response period Tb ends and ends when the next image sub-frame begins.

The back lights should be lighted intermittently for the following reasons. The colors to be presented in two adjacent image sub-frames are different, and the line-by-line scanning on the gate lines and line-by-line refresh on the content of the pixel units need a certain period of time, i.e., the sum of the row scanning period Ta and the response period Tb. If the back light keeps in a lighting state in the row scanning period Ta and the response period Tb, then a mix of the image colors may occur because the display refresh has not been performed for a part of pixel units on the whole array substrate. For example, when the liquid crystal in the last row of pixel units has not been refreshed or rotated to a predetermined position, the color of the former image sub-frame is still presented. If the back light for the current image sub-frame is lighted at this time, then the display corresponding to the rotation angle of the liquid crystal does not match the back light, and improper image displaying will occur.

It can be known from the above that the conventional FSC type TFT-LCD uses a row scanning display refresh driving method, that is to say, at the same time, the image signal voltage in only one row of pixel units and the corresponding display are refreshed. In order to avoid the color mixing, the back light must be turned off temporarily. After the image refresh of the current image sub-frame is completed and the liquid crystal has responded, the corresponding homochromous back light is lighted. Therefore, there is a disadvantage of low utilization efficiency of the back light, and the back light only can be illuminated in a part of time period for each image sub-frame. In the conventional FSC type TFT-LCD, since the row scanning period Ta and the liquid crystal response period Tb for the display refresh of each image sub-frame occupy a large part of the cycle time of an image sub-frame, and the back light "ON" period Ton is reduced dramatically, which renders the reduced utilization efficiency of the back light accordingly. Thus, the image brightness of the LCD is decreased, or the power consumption and the cost are increased in order to enhance the brightness. The shortcoming become more prominent in the case of a high frame frequency and a high resolution display, i.e., in the case where the image sub-frame cycle time is short and the row scanning period Ta is long.

Figure 3:
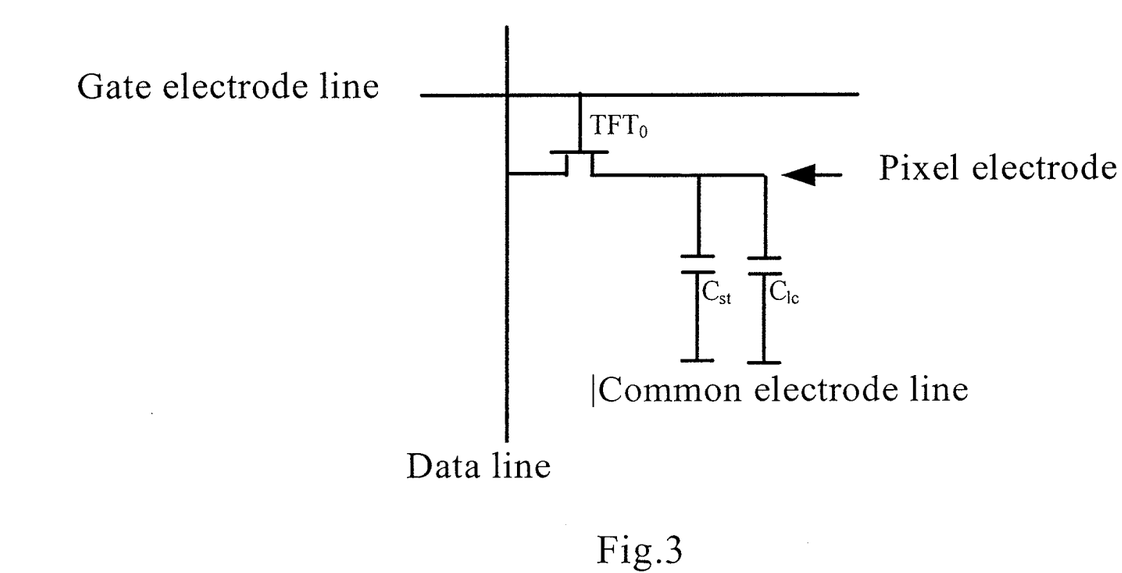
FIG. 3 is an equivalent circuit diagram of a pixel unit in a conventional array substrate.

FIG. 3 shows an equivalent circuit diagram of a pixel unit in a conventional array substrate.

SUMMARY

One embodiment of the invention provides an array substrate comprising a base substrate; a plurality of gate lines and data lines crossed with each other so as to define a plurality of pixel units in a matrix on the base substrate, each pixel unit comprising: a drive switch, a pixel electrode, a working storage element connected with the drive switch and used to hold image voltage signals inputted from the corresponding data lines through the driving switch, and a display refresh switch connected with the working storage element and the pixel electrode; a plurality of frame refresh lines, used to input frame refresh signals including a frame refresh "ON" signal and a frame refresh "OFF" signal to the corresponding pixel unit so as to control the display refresh switch of the corresponding pixel unit to be turned on or off, wherein the display refresh switch inputs the image voltage signal to the pixel electrode as an image signal voltage when the frame refresh line inputs the frame refresh "ON" signal.

Another embodiment of the invention provides A driving method for an array substrate of a liquid crystal display, the method comprising: performing a display refresh operation on each pixel unit on the array substrate in a row sequence so as to refresh working storage elements in each pixel unit row by row, until the working storage elements of the pixel units in all rows in one image frame is refreshed, thus image voltage signals corresponding to the pixel units in each row are inputted to the working storage elements to be held; inputting a frame refresh "ON" signal to display refresh switches of the pixel units in each row, and inputting the image voltage signals held in the working storage elements of the pixel units in each row to the pixel electrodes of the pixel units in each row as image signal voltages, so that one image frame is refreshed; after charging for pixel capacitors of the pixel units in each row has completed, inputting a frame refresh "OFF" signal so as to turn off the display refresh switch, so that the working storage elements of the pixel units in each row prepare to the storage for the image voltage signals for the next frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention.

DETAILED DESCRIPTION

An embodiment of the invention provides an array substrate, and the array substrate comprises a base substrate and a plurality of gate lines and data lines crossed with each other on the base substrate. These gate lines and the data lines define a plurality of pixel units arranged in a matrix. Each pixel unit comprises a TFT drive switch and a pixel electrode. Each pixel unit further comprising a working storage element and a display refresh switch. The array substrate further comprises frame refresh lines.

The working storage element is provided for each pixel unit and is connected with the TFT drive switch of the pixel unit. The working storage element is used to temporarily store the image voltage signal inputted over the data line through the TFT drive switch.

The display refresh switch is provided for each pixel unit and connected with the working storage element and pixel electrode of the pixel unit. For each pixel unit, the display refresh switch is controlled by the frame refresh line and is used to input the image voltage signal stored in the working storage element into the pixel electrode when the frame refresh line inputs a frame refresh "ON" signal.

The frame refresh line is used to input frame refresh signals including a frame refresh "ON" signal and a frame refresh "OFF" signal, so as to control the display refresh switch to be turned on or off.

The conventional array substrate uses a matrix addressing structure comprising gate lines, data lines and TFT drive switches, so that only the displaying content in one row of pixel units can be refreshed at one time.

However, for the embodiment of the invention, the input and temporary storage of the image voltage signals in each row and the pixel electrode display refresh can be separated. First, a row scanning is performed with the gate lines, the data lines and the TFT drive switches, and the image voltage signals are stored by the working storage elements. After the working storage elements in all the pixel units are refreshed, one or several frame refresh "ON" signals may be used to control the display refresh switches, so that the image voltage signals in the working storage elements are transmitted to the pixel electrodes and the image refresh of a group of or all the pixel electrodes is completed. The embodiment enables the separation of the scanning signal refresh and the image refresh, and one or several frame refresh "ON" signals can control the displaying content of the pixel units in a part of or the whole of the array substrate to be refreshed synchronically.

The configuration of the working storage element and the image refreshing switch can be preferably designed in combination with the existing structure of the array substrate. Hereinafter, the embodiment of the invention will become apparent from the following description in connection with the figures.

First Embodiment

Figure 4:
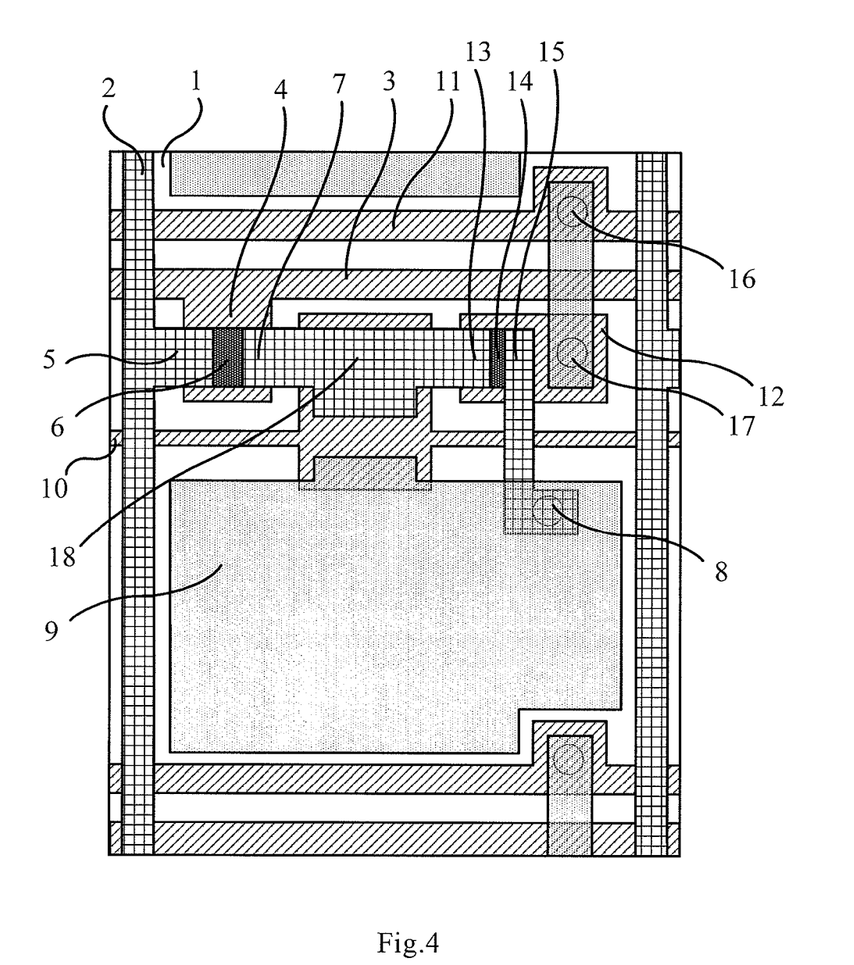
FIG. 4 is a schematic top view showing a structure of a pixel unit of an array substrate according to a first embodiment of the invention.

FIG. 4 is a schematic top view showing a structure of a pixel unit of an array substrate according to a first embodiment of the invention. The array substrate comprises a base substrate 1 on which a plurality of gate lines 3 and a plurality of data lines 2 crossed with each other are formed and define a plurality of pixel units in a matrix. FIG. 4 shows a structure of one of the pixel units. Each pixel unit is provided with a TFT drive switch, a working storage element, a display refresh switch and a pixel electrode 9. The frame refresh line 11 is connected with the display refresh switch. In another embodiment, a common electrode line 10 may further be formed on the base substrate 1.

The TFT drive switch comprises a first gate electrode 4, a first active layer 6, a first source electrode 5 and a first drain electrode 7. The first gate electrode 4 is connected with the gate line 3, and the first source electrode 5 is connected with the data line 2. When the gate line 3 inputs a row refresh "ON" signal to the first gate electrode 4, the first drain electrode 7 is electrically communicated with the first source electrode 5 through the first active layer 6, and the first source electrode 5 transmits the image voltage signals from the data line 2 to the first drain electrode 7.

An example of the working storage element is a working storage capacitor 18, which is connected with the first drain electrode 17 of the TFT drive switch and receives the image voltage signal in the first drain electrode 7. When the gate line 3 stops inputting the row refresh "ON" signal, i.e., inputs a row refresh "OFF" signal, the first source electrode 5 is disconnected with the first drain electrode 7, and the image voltage signal is stored in the working storage capacitor 18.

The display refresh switch comprises a second gate electrode 12, a second active layer 14, a second source electrode 13 and a second drain electrode 15, and this switch also employs the TFT switch structure. The second source electrode 13 is connected with the working storage capacitor 18, and the second gate electrode 12 is connected with the frame refresh line 11. The second drain electrode 15 is connected with the pixel electrode 9 through the first via hole 8.

When the frame refresh line 11 inputs a frame refresh "ON" signal to the second gate electrode 12, the second drain electrode 15 is electrically communicated with the second source electrode 13 and inputs the image voltage signal stored in the working storage 18 to the pixel electrode 9. Then, a frame refresh "OFF" signal is inputted by the frame refresh line 11 to control the display refresh switch to be turned off, that is to say, the second source electrode 13 is disconnected with the second drain electrode 15, and the working storage capacitor 18 is in a state to store the image voltage signal of the next frame.

In order to simply the process and reduce costs, it is preferable that the working storage capacitor, the frame refresh line and the display refresh switch are formed with the other structures on the substrate simultaneously.

In the embodiment, the TFT drive switch and the display refresh switch have the same structure; preferably, each part of them are formed from the same material in the same patterning process and thus formed in the same layer simultaneously.

The pattern of the first electrode of the working storage capacitor 18 may be formed in the same layer as the data line 2, and the pattern of the second electrode of the working storage capacitor 18 may be formed in the same layer as the gate line 3; Or, when a common electrode line is formed on the base substrate, preferably, the pattern of the second electrode of the working storage capacitor 18 is formed integrally with the common electrode line 10 formed on the base substrate 1.

It is preferably that the frame refresh line 11 is formed in the same layer as the gate line 3 and extends in parallel with the gate line 3. The frame refresh line 11 and the second gate electrode 12 are covered with an insulating layer, which is called a passivation layer also, and the pixel electrode 9 is formed on the insulating layer. The frame refresh line 11 is connected with the second gate electrode 12 through a component made of the material used to form the pixel electrode 9 and filled in the second via hole 16 and the third via hole 17. The second via hole 16 and the third via hole 17 correspond to the positions of the frame refresh line 11 and the second gate electrode 12, respectively.

The array substrate according to the embodiment may further comprise a peripheral circuit, i.e., a driving circuit for inputting the frame refresh signals including a frame refresh "ON" signal and a frame refresh "OFF" signal. The circuit is connected with each frame refreshing line.

After the array substrate in the embodiment is bonded with a color filter substrate, the equivalent circuit of each pixel unit is shown in FIG. 4. The first source electrode of the TFT drive switch ($TFT_0$) is connected with the data line; the first gate electrode of the TFT drive switch ($TFT_0$) is connected with the gate line; the first drain electrode of the TFT drive switch ($TFT_0$). The first electrode of the working storage capacitor ($C_{signal}$) and the common electrode line are equipotential points. The second drain electrode of the display refresh switch ($TFT_{refresh}$) is connected with the pixel electrode. The overlapping portion of the pixel electrode and the common electrode line form a storage capacitor ($C_{st}$). The liquid crystal capacitor ($C_{lc}$) is formed between the pixel electrode and the common electrode on the color filter substrate, for example, and used to drive the rotation of the liquid crystal. The storage capacitor ($C_{st}$) is formed between the pixel electrode and the common electrode line to keep the voltage on the liquid crystal capacitor ($C_{lc}$) stable.

Compared with the equivalent circuit of the conventional array substrate as shown in FIG. 3, a working storage capacitor ($C_{signal}$), a frame refresh line and a display refresh switch ($TFT_{refresh}$) are added to each pixel unit of the array substrate according to the embodiment, and thus, the separation of the row scanning signal refresh and the image refresh can be realized.

The operation principle of the array substrate of the embodiment is as follows. When the gate line 3 inputs a row refresh "ON" signal to the first gate electrode 4 of the TFT drive switch of one pixel unit, the source electrode 5 is electrically communicated with the first drain electrode 7, and the image voltage signal inputted from the data line 2 to the first source electrode 5 can be transmitted to the first drain electrode 7; the first drain electrode 7 is connected with the working storage capacitor 18, that is to say, the working storage capacitor 18 is charged by the image voltage signal; when the gate line 3 stops inputting the row refresh "ON" signal, i.e., inputs a row refresh "OFF" signal, the first source electrode 5 is disconnected with the first drain electrode 7, and the image voltage signal is stored in the working storage capacitor 18; when the frame refreshing line 11 inputs a frame refresh "ON" signal to the gate electrode 12 of the display refresh switch, the second source electrode 13 is electrically communicated with the second drain electrode 15; the second drain electrode 15 is connected with the pixel electrode 9, then the working storage capacitor 18 is discharged through the second source electrode 13 and the second drain electrode 15 and the pixel electrode 9 is charged accordingly, and the stored image voltage signal is applied to the pixel electrode 9. Thus, the display refresh of the pixel electrode 9 in the pixel unit is completed. Then, the display refresh switch is controlled to be "OFF" by the frame refresh "OFF" signal input over the frame refreshing line 11, i.e., the second source electrode 13 and the second drain electrode 15 are controlled to be disconnected, and the working storage capacitor 18 is in a state for the storage of the frame image voltage for the next image.

Figure 6:
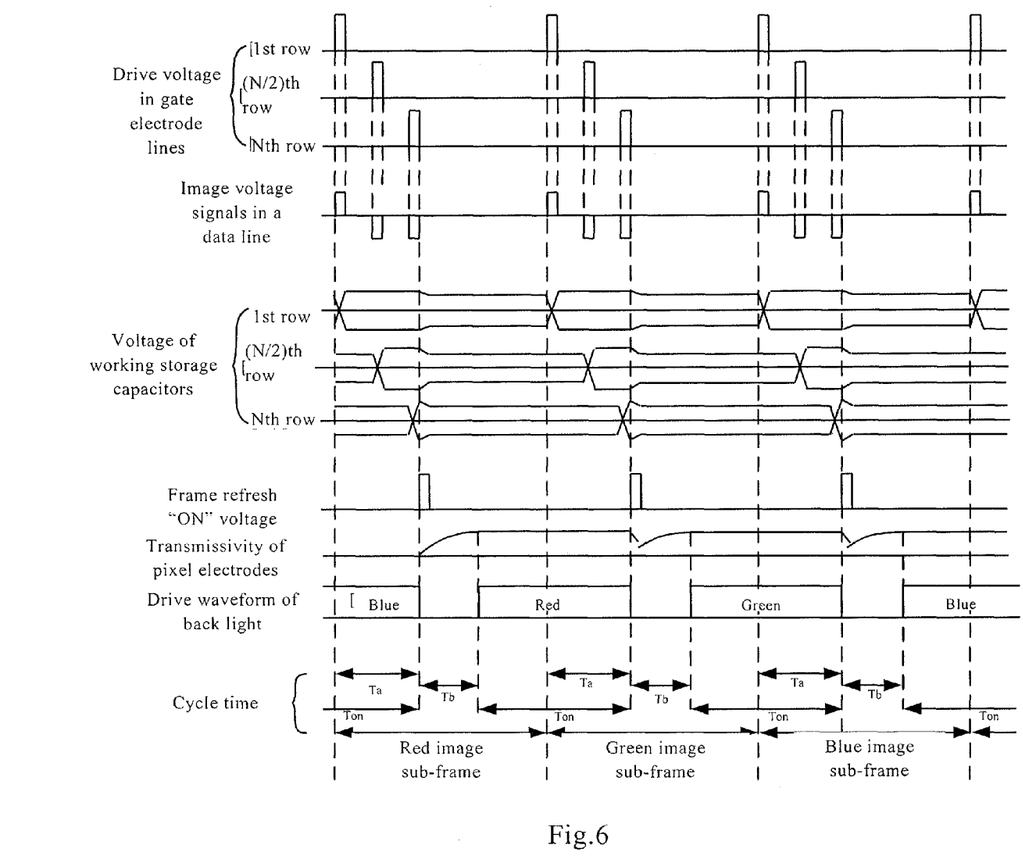
FIG. 6 is a schematic view showing a drive waveform in the array substrate according the first embodiment with the time elapsing.

Based on the structure of the array substrate according to the embodiment, the row scanning on the pixel electrodes can be performed when the row refresh "ON" signal and the image voltage signal are inputted, and the display refresh for the pixel electrode can be performed when a frame refresh "ON" signal is inputted. That is to say, the row scanning signal refresh and the display image refresh can be performed in two separate steps. When the array substrate according to the embodiment is applied to an FSC type TFT-LCD, the waveform is shown in FIG. 6. The meanings of each line in FIG. 6 are the same to those in FIG. 2, but the voltage variation of the first electrode and the second electrode of the working storage capacitors in the pixel units in the first row, the (N/2)th row and the Nth row and the waveform of the frame refresh signal are added. Since a LCD generally adopts an inverse driving manner, in which the electrical polarities of two adjacent image frames are opposite to each other, the voltage of the two electrodes of the working storage capacitor will be inversed when the working storage capacitor is charged between two adjacent image frames. The driving method may specifically comprise the following steps. In the case of an FSC type TFT-LCD, the image frame comprises image sub-frames (for example, three image sub-frames), but each sub-frame is regarded as an individual image frame for the purpose of clear description; on the other hand, for other type of TFT-LCD, each image frame is regarded as an individual frame. Thus in these cases, one so-called image frame starts when the data line begins to input the data voltage signal and ends when the data line begins to input the data voltage signal for the next time.

When an image frame begins, row refresh "ON" signals and image voltage signals are inputted into TFT switches of the pixel units row by row (i.e., line by line). For a pixel unit, when a row refresh "ON" signal is inputted into the first gate electrode, the image voltage signal inputted from the first source electrode will be inputted into the first drain electrode, and the first drain electrode transmits the image voltage signal into the working storage capacitor connected thereto; when the gate line inputs a row refresh "OFF" signal, the first source electrode is disconnected with the first drain electrode, and the image voltage signal is hold in the working storage capacitor.

Display refresh operation is carried out on the pixel units row by row (i.e., line by line) so as to refresh the working storage capacitors in each row until all the working storage capacitors in the pixel units in all the rows of one frame are refreshed.

A refresh "ON" signal is inputted into the display refresh switches in all the pixel units synchronically through the frame refresh lines. For each pixel unit, when the frame refresh "ON" signal is inputted into the second gate electrode, the second source electrode connected with the working storage capacitor will transmit the image voltage signal stored in the working storage capacitor to the second drain electrode, and the second drain electrode inputs the image voltage signal into the pixel electrode connected thereto so as to have the whole image refreshed.

After charging for pixel capacitors of the pixel units in each row has completed, a frame refresh "OFF" signal is inputted over the frame refresh line so as to control the display refresh switch to be in an "OFF" state, and the working storage capacitor prepares to store the image voltage signal of the next frame.

Since the above embodiment can increase the time for which the image in one image frame are actually displayed, the array substrate and the driving method preferably are applied for an FSC type TFT-LCD. After liquid crystal of the pixel unit in each row has responded and the image has been refreshed, the back light corresponding to the current image frame is turned on, and continues to light until the back light corresponding to the current image frame is turned off just before the frame refresh "ON" signal for the next image frame is inputted.

Based on the structure of the array substrate, the image voltage signal needs to be inputted row by row; however, for the technical solution of the embodiment, only the working storage capacitor in each pixel unit is refreshed when the image voltage signal is inputted, and the refresh of the display of the pixel electrode is not performed at the same time. When the frame refresh "ON" signal is inputted, a synchronic display refresh is performed on all the pixel units across the whole array substrate, or, the display refresh is performed on the pixel units of the regions on the array substrate region by region through a plurality of frame refresh "ON" signals; therefore, the actual display time of the image can be increased. Based on the above technical solution, the back light can continue to light in the period when the row scanning refresh is performed for the next image frame. Since the image refresh has not been performed, the image for the current frame is kept to be unchanged, and the defects such as color mixing will not occur when applying field sequence color mode. Since the back light "ON" period Ton for the current image frame may continue until the row scanning period Ta for the next frame, the back light can illuminate, the "ON" time of the back light is extended, and the utilization efficiency is increased.

Second Embodiment

The second embodiment of the invention provides a driving method of an array substrate, comprising the following steps:

Step 100, at the beginning of a current image frame, a display refresh operation is performed on the pixel units in the first row. That is to say, a row refresh "ON" signal is inputted into the TFT drive switch in pixel units in the row through the gate line, and image voltage signals are inputted to the TFT drive switches in the pixel units in the row through the data lines, the image voltage signals are inputted into the working storage elements in the pixel units in the row through the TFT drive switches, and thereafter, a row refresh "OFF" signal is inputted through the gate line so as to turn off the TFT drive switches, and the image voltage signals are stored.

Step 200, a display refresh operation is performed on the pixel units in the remaining rows in a row-by-row manner so as to refresh the working storage elements of the remaining pixel units row by row, until all the working storage elements in the pixel units in all the rows in one image frame are refreshed.

Step 300, a frame refresh "ON" signal is inputted into the display refresh switches in each pixel unit through all the frame refresh lines synchronically. The display refresh switches are turned on and the image voltage signals in the working storage elements in the pixel units in each row are inputted into pixel electrodes of the pixel units, thus the image refresh is performed.

Step 400, after charging for pixel capacitors of the pixel units in each row has completed, a frame refresh "OFF" signal is inputted through all the frame refresh lines so as to control the display refresh switches to be turned off, and the working storage elements become in a state for the storage of the image voltage signals of the next image.

Based on the embodiment, the time for which the image of one image frame is maintained on the liquid crystal display can be increased.

The embodiment can be preferably applied to an FSC type TFT-LCD, the following operation for the back light may be performed after liquid crystal of the pixel unit in each row has responded and the image has been refreshed.

Step 500, the back light corresponding to the current image frame is turned on (thus lights) until just prior to the frame refresh "ON" signal is inputted by the next image frame.

In one example, a working storage capacitor may be used as an example of the working storage element for each pixel unit, each TFT drive switch comprises a first gate electrode, a first active layer, a first source electrode and a first drain electrode, and the TFT drive switch works to store the image voltage signal into the working storage element as follows.

When a row refresh "ON" signal is inputted into the first gate electrode, the image voltage signal inputted from the first source electrode is transmitted to the first drain electrode, and the first drain electrode transmits the image voltage signal to the working storage capacitor connected thereto.

A row refresh "OFF" signal is inputted to the first gate electrode, and the first source electrode is disconnected with the first drain electrode and the image voltage signal is stored in the working storage capacitor.

Each display refresh switch may comprise a second gate electrode, a second active layer, and a second source electrode and a second drain electrode. A frame refresh "ON" signal is inputted to the display refresh switches in all the pixel units through the frame refresh lines synchronically, and the display refresh switches in all the pixel units are turned on, the image voltage signals in the working storage elements in all the pixel units are inputted into the pixel electrodes in all the pixel units, so as to perform an image refresh. The image refresh may comprise the following.

When a frame refresh "ON" signal is inputted into the second gate electrode in each pixel unit by the frame refresh line, the second source electrode connected with the working storage element transmits the image voltage signal stored in the working storage element to the second drain electrode, and the second drain electrode transmits the image voltage signal to the pixel electrode connected thereto.

The driving method in the embodiment of the invention may be performed by the array substrate of the embodiment of the invention, and this method can perform separately the row scanning signal refresh and the image refresh. During the period in which the row scanning signal is refreshed, the image of the previous image frame can be still maintained, and the illumination of the back light for the previous frame can be kept during this row scanning period. By the frame refresh "ON" signal, the display refresh in all the pixel units can be driven synchronically so as to short the time for image refresh. Therefore, the embodiment may increase the "ON" time of the back light and enhance the utilization efficiency of the back light.

The embodiment of the invention can be applied to various types of TFT-LCDs, and in particular, to an FSC type TFT-LCD. The disadvantages of the conventional FSC type TFT-LCD include the need of higher working frequency. With the color mixing manner of three color image sub-frame, the frame image refresh working frequency is three times lager than that in the normal TFT-LCD in the case of the same image content refresh frequency. In order to avoid color break, the frame image refresh working frequency may be increased additionally. In addition, in the conventional FSC type TFT-LCD, since the homochromous back light is only turned on in a small part of image frame cycle time, the utilization efficiency of the back light is low, and a higher peak brightness is needed to compensate the low efficiency. The embodiment of the invention can overcome the above problems. By separating the signal row scanning refresh from the display refresh, the ratio of the image display refresh to the whole image frame cycle time is decreased. In the row scanning, the displayed image is kept unchanged and therefore the back light with the color corresponding to the image frame signal can be turned on continuously.

On the basis of the embodiment, when a capacitor is used as the working storage element, due to the influence of the residual charge in the storage capacitor and the liquid crystal capacitor ($C_{lc}+C_{st}$) caused by the image voltage signal of the immediately previous image frame, there is difference between the refresh result on the pixel electrode for displaying content and the signal voltage in the working storage capacitor, the signal voltage may be compensated in a certain manner so as to ensure the signal voltage on the pixel electrode. The whole capacitor formed by the storage capacitor and the liquid crystal capacitor ($C_{lc}+C_{st}$) can be referred to a pixel capacitor; when no storage capacitor is formed for each pixel unit, the pixel capacitor is equivalent to the liquid crystal capacitor.

Figure 5:
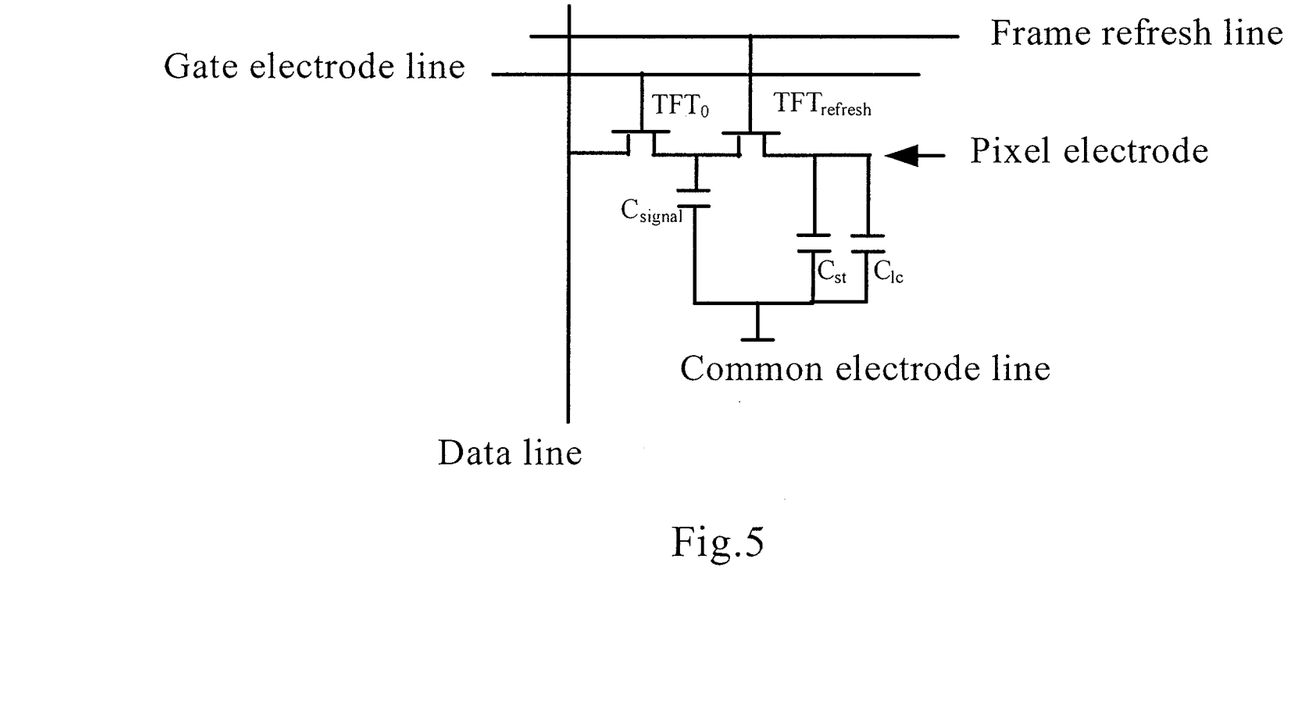
FIG. 5 is an equivalent circuit diagram of a pixel unit in the array substrate according to the first embodiment of the invention.

When the array substrates as shown in FIGS. 4 and 5 is used, considering the influence of the image displaying signal and the pixel driving invert in the pixel electrode of the previous image frame (the (P–1)th frame), the image voltage signal inputted to the working storage capacitor of the current frame (the Pth frame) needs to be compensated. In case of neglecting the parasitical parameter, the compensated image voltage signal ($V_{signal}$) may be calculated by using the following compensating equation and is used as the image voltage signal inputted to the TFT drive switch through the data line:

$$V_{signal}(p) = \frac{1}{C_{signal}}[V_{frame}(p)(C_{signal} + C_{st} + C_{lc}) - V_{frame}(p-1)(C_{st} + C_{lc})]$$

wherein $V_{frame}$ represents the image signal voltage on the pixel electrode of a certain frame.

The above compensating calculation may be realized by designing the driving program.

It should be understood by those skilled in the art that all or a part of the steps in the above method embodiment may be carried out by a calculation device under the instructions of a program. The above program may be stored in a storage medium. When the program is carried out, the steps in the above method embodiment can be performed. The storage medium may comprise various medium, such as ROM, RAM, magnetic disk and optical disk, for storing program code.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A driving method for an array substrate of a liquid crystal display, comprising:
    performing a display refresh operation on pixel units on the array substrate row by row so as to refresh working storage elements in each pixel unit row, until the working storage elements of the pixel units in all rows in one image frame is refreshed, thus image voltage signals corresponding to the pixel units in each row are inputted to the working storage elements and stored therein;
    inputting a frame refresh "ON" signal to display refresh switches of the pixel units, and inputting the image voltage signals stored in the working storage elements of the pixel units to the pixel electrodes of the pixel units, so that one image frame is refreshed; and
    after charging for pixel capacitors of the pixel units in each row has completed, inputting a frame refresh "OFF" signal so as to turn off the display refresh switches, so that the working storage elements of the pixel units become in a state to store image voltage signals for a next frame;
    wherein the working storage elements are working storage capacitors, and the image voltage signal inputted to each pixel unit through the corresponding data line is determined according to the following equation:

$$V_{signal}(p) = \frac{1}{C_{signal}}[V_{frame}(p)(C_{signal} + C_{st} + C_{lc}) - V_{frame}(p-1)(C_{st} + C_{lc})]$$

wherein $V_{signal}$ represents the image voltage signal, p represents a current image frame, p−1 represent a previous image frame, $C_{signal}$ represents capacitance of the working storage capacitor in the pixel unit, $V_{frame}$ represents the image signal voltage on the pixel electrode in each pixel unit, $C_{st}$ represents the capacitance of the storage capacitor in each pixel unit, and $C_{lc}$ represents the capacitance of the liquid crystal capacitor in each pixel unit.

2. The driving method for the array substrate of claim 1, further comprising:
    after charging for pixel capacitors of the pixel units in each row has completed, turning on a back light corresponding to the current image frame until just before a frame refresh "ON" signal is inputted for a next image frame.

3. The driving method for the array substrate of claim 1, wherein inputting a row refresh "ON" signal to TFT drive switches of the pixel units through the gate lines, and inputting image voltage signals to the TFT drive switches of the pixel units through the data lines, so that the TFT drive switches input image voltage signals to the working storage elements of the pixel units, and thereafter, inputting a row refresh "OFF" signal through the gate lines to turn off the TFT drive switches, so that the image voltage signals are stored in the working storage elements of the pixel units.

4. The driving method for the array substrate of claim 1, wherein inputting the frame refresh "ON" signal to the display refresh switches in the pixel units synchronically through the frame refresh lines.

5. The driving method for the array substrate of claim 1, wherein the pixel units are divided in a plurality of regions on the array substrate, and the regions are image refreshed region by region with the frame refresh lines.

6. The driving method for the array substrate of claim 1, wherein the driving method is applied to display each color image sub-frame in one image frame in an field sequential color (FSC) type thin film transistor liquid crystal display (TFT-LCD).

7. A non-transitory computer-readable medium, wherein a computer program for implementing the driving method for the array substrate of claim 1 is stored in the computer-readable medium.

* * * * *